United States Patent [19]

Cooper

[11] 4,252,359

[45] Feb. 24, 1981

[54] FORCE LIMITER

[75] Inventor: Francis H. Cooper, Roxboro, N.C.

[73] Assignee: RPC Corporation, Roxboro, N.C.

[21] Appl. No.: 941,770

[22] Filed: Sep. 13, 1978

[51] Int. Cl.³ .......... B66C 1/66; F16F 7/00

[52] U.S. Cl. .......... 294/81 SF; 74/470; 74/582; 267/136

[58] Field of Search .......... 294/67 R, 67 DA, 81 SF; 213/40 R, 44, 45, 49; 267/69-72, 136-138, 134; 74/470, 581-584, 592, 593; 280/487

[56] References Cited

U.S. PATENT DOCUMENTS

| | | | |
|---|---|---|---|
| 213,974 | 4/1879 | Butler | 213/40 R |
| 594,729 | 11/1897 | Crosby | 267/71 X |
| 1,845,816 | 2/1932 | Savage | 280/487 X |
| 2,402,400 | 6/1946 | Hewitt et al. | 213/45 X |
| 3,086,303 | 4/1963 | Weeks | 267/34 X |
| 3,493,258 | 2/1970 | Wyrough | 294/81 SF X |
| 3,611,827 | 10/1971 | Bottum et al. | 74/582 X |
| 3,712,661 | 1/1973 | Strand | 294/81 SF X |
| 3,990,722 | 11/1976 | Casad et al. | 267/138 X |

FOREIGN PATENT DOCUMENTS

| | | | |
|---|---|---|---|
| 1271987 | 8/1961 | France | 267/138 |

*Primary Examiner*—Johnny D. Cherry
*Attorney, Agent, or Firm*—Bruce M. Winchell; John H. Mulholland

[57] ABSTRACT

A bidirectional force limiter for limiting the magnitude of a force applied along a line of action to a predetermined magnitude includes a slide assembly supported for reciprocating movement along its longitudinal axis by the spaced guide plates of a support structure. A yieldable force-bias element, such as a helical spring in compression, is constrained between the guide plates, and structure is provided for transmitting the applied force from the slide assembly to the biasing element to cause the slide assembly to displace and the biasing element to yield in response to the applied force. The force limiter is suitable for use, in a preferred mode, with cargo-container spreaders which are adapted to attach to and detach from cargo containers. The spreader carries a plurality of locks which are adapted to register with and engage complementary lock receiving structures on each container. A hydraulic actuator is linked to the locks through a rotatable shift to selectively actuate them between a locked position and an unlocked position to, respectively, attach the spreader to the container and detach the spreader from the container. The force limiter is connected between the hydraulic actuator and the spreader frame to limit the applied locking and unlocking forces to a predetermined, safe magnitude. The force limiter prevents excessively high hydraulic fluid pressure from damaging a jammed lock or over-riding safety devices designed to prevent unlocking when the spreader and attached cargo container are in a suspended position.

11 Claims, 6 Drawing Figures

FORCE LIMITER

BACKGROUND OF THE INVENTION

The present invention relates to bidirectional force limiters and, more particularly, to a force limiter designed to limit the magnitude of a force applied in either direction along a line of action to a safe, predetermined level.

There are many mechanical devices which are actuated between first and second positions, such as operative and inoperative positions, by the application of an actuating force along a line of action. In many of these force actuation environments, there is a need to limit the magnitude of the applied force to a predetermined value for safety or operational reasons. An example of one such environment is the handling and transportation of standard-sized cargo-containers in which container handling structures, known as spreaders, are used for attaching to and detaching from the container to assist in moving the container from one location to another, such as from the deck of a container ship to a railroad flat car or highway truck. The spreaders, in one exemplary design, include a trusslike structural steel frame which is sized to straddle and fit over the container and a plurality of depending arms and lock assemblies which are adapted to engage and lock onto the container. The locks are generally of the twist type which are selectively actuatable by the application of a force, for example, from an hydraulic actuator, between an unlocked position and a locked position to either detach or attach the container and spreader. When the spreader is attached to the container, the spreader may be lifted, for example, by a gantry-like hoist or crane to transport the container. Spreaders of this type have found widespread use in the loading and unloading of container ships as well as in the transferring of containers to and between railway flat cars and highway trucks.

For safety reasons, it is important that force applied to the twist locks be limited to a predetermined magnitude to prevent excessive force from being applied to a temporarily jammed lock thereby causing damage to the lock and to prevent excessive force from overriding mechanical safety devices designed to prevent unlocking when the container and spreader are in a suspended position.

Consequently, it is a broad overall object of the present invention to provide a force limiter to limit a force applied along a line of action to a predetermined magnitude.

It is another object of the present invention to provide a force limiter for limiting the force applied in either direction along a line of action to a predetermined magnitude.

It is still another object of the present invention to provide a force limiter for limiting the magnitude of an applied force which includes a force bias means adapted to yield in response to the applied force.

It is a further object of the present invention to provide a force limiter for use in combination with a spreader for handling and transporting cargo containers in which the locking and unlocking force applied to locking assemblies mounted on the spreader are limited by the force limiter to a safe, predetermined magnitude.

SUMMARY OF THE INVENTION

A force limiter for limiting the magnitude of a force applied in either direction along a line of action includes an actuatable shaft to which the force is applied mounted for movement along its longitudinal axis on the spaced guide plates of a support means. Yieldable force bias means are located between the guide plates and means are provided by which the applied force is transferred from the actuatable shaft to the force bias means to cause the bias means to yield and the actuatable shaft to displace in response to the applied force.

In the preferred embodiment, the actuatable shaft is part of a slide assembly which also includes at least one guide rod. The slide assembly is mounted for reciprocation along its longitudinal axis on the support structure which includes the spaced apart guide plates having coaxial bores formed therein for mounting the slide assembly. A helical coil spring is mounted on the actuatable shaft between the guide plates with thrust washers and spacer sleeves to transfer the applied force to the spring.

The force limiter, when used in combination with a spreader, provides an improved spreader for the handling and transportation of cargo containers. The spreader includes a frame having locks mounted thereon which are adapted to lock onto and unlock cargo containers in response to a force applied by a suitable actuator, such as a hydraulic cylinder. The force limiter is connected to the actuator to limit the force applied to the locks to a predetermined, safe magnitude.

BRIEF DESCRIPTION OF THE DRAWINGS

The above description, as well as further objects, features, and advantages, of the present invention will be more fully appreciated by reference to the following detailed description of a presently preferred but nonetheless illustrative embodiment in accordance with the present invention, when taken in connection with the accompanying drawings wherein.

DESCRIPTION OF THE PREFERRED EMBODIMENT

Figure 1:
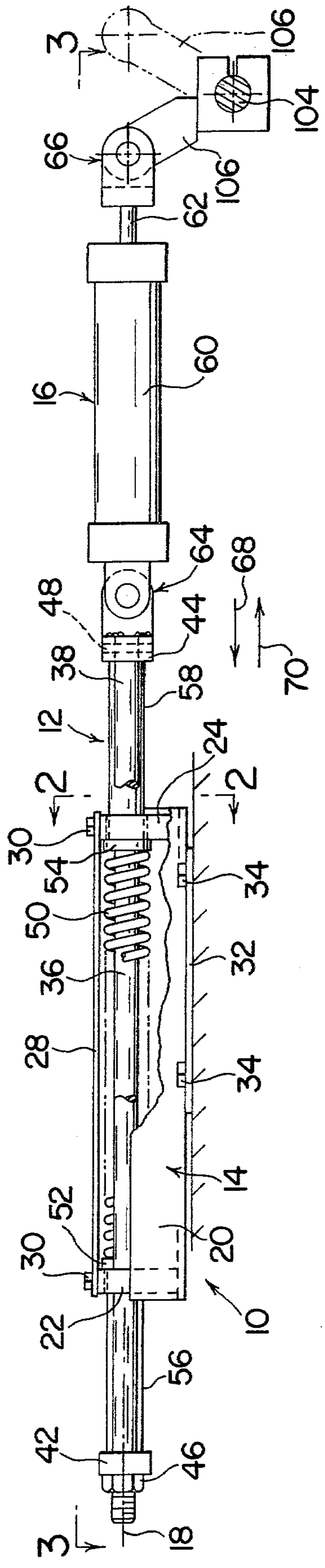
FIG. 1 is a side elevational view of a bidirectional force limiter in accordance with the present invention in which selected elements have been broken away for reasons of clarity.

A force limiter in accordance with the present invention is generally referred in the figures by the reference character 10 and includes a slide assembly 12 mounted in a support structure 14. The slide assembly 12, as described in detail below, is normally maintained in an equilibrium or intermediate position relative to the support structure 14 and can be moved by the application of a suitable force, for example, from a hydraulic actuator 16 in either direction along the longitudinal axis 18 of the slide assembly 12.

Figure 2:
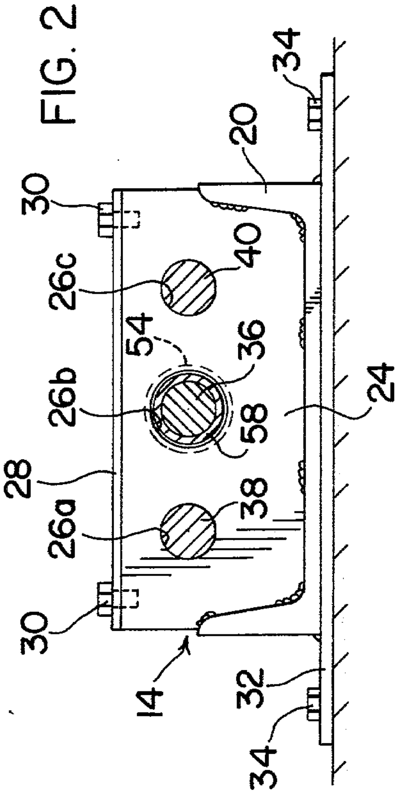
FIG. 2 is an enlarged end elevational view of the force limiter shown in FIG. 1 taken along line 2—2 of FIG. 1.

The support structure 14, which is preferably fabricated as a weldment, includes a support channel 20 and transverse guide plates 22 and 24 secured at or near the ends of the channel 20. Each of the guide plates, 22 and 24, has three bores 26*a, b,* and *c* (FIG. 2) formed therethrough with bores of the two guide plates being formed in-line or in register with one another. The bores 26*a, b,* and *c* may be formed, for example, after the guide plates 22 and 24 are welded in place by a line-boring operation. A cover plate 28 spans the top of the force limiter 10 between the two guide plates 22 and 24 and is secured in place by suitable threaded fasteners 30 passing through suitable holes formed in the cover plate and each guide plate. The cover plate 28 provides a measure of protection for the elements of the slide assembly 12 and an added measure of structural rigidity for the entire force limiter 10. A base plate 32 is secured to the web side of the channel 20 and is used to connect the force limiter to a suitable support surface by threaded fasteners 34.

The slide assembly 12 includes a hydraulically actuatable shaft 36, guide rods 38 and 40 located on each side of the shaft 36, and end plates 42 and 44 to which the ends of the shaft and rods are secured. The shaft 36 may be secured to the end plates 42 and 44 by threading both ends of the shaft and passing one end through a bore formed in the end plate 42 and securing the shaft in place with a nut 46 as shown on the left side of FIGS. 1 and 3 and by engaging the other end of the shaft with a suitable threaded bore formed in the end plate 44 as shown on the right side of FIGS. 1 and 3. The ends of the guide rods 38 and 40 may be inserted in suitable bores formed in the end plates 42 and 44 and secured in place by suitable fasteners 48, for example, set screws or pins.

A biasing force, while limits the magnitude of the force applied to the limiter 10 and which maintains the slide assembly 12 in an intermediate or equilibrium position, is provided by a helical spring 50, acting in cooperation with thrust washers 52 and 54, and spacer sleeves 56 and 58.

The helical spring 50 is mounted on the shaft 36 such that it extends between and is constrained by the guide plates 22 and 24. The thrust washers, 52 and 54, are mounted on the shaft 36, respectively, between each end of the spring 50 and the adjacent guide plates, 22 and 24; and the spacer sleeves, 56 and 58, are mounted, respectively, on the end portions of the shaft 36 between their respective thrust washers, 52 and 54, and their respective end plates, 42 and 44. Each sleeve, 56 and 58, is adapted to reciprocate relative its respective mounting bore 26*b* and, in the preferred embodiment, the sleeves are of equal length to establish the intermediate or equilibrium position of the slide assembly 12.

The structure described above is adapted to limit the amount of force applied in either direction substantially along the longitudinal axis 18 of the slide assembly 12. The force may be applied, for example, by the double acting hydraulic actuator 16, which includes a cylinder 60 portion and a ram 62. The slide assembly 12 may be connected to the cylinder 60 through a clevis and pin connection 64, and the ram 62 may be connected to a twist lock cross shaft, which is described in more detail below, by another clevis and pin connection 66.

The preloaded spring 50 always has a load bias in the equilibrium position that is greater than the force required to rotate link 106 between its two extreme positions in the performance of its normal function. The force limiter will only operate to compress the spring a greater amount when the mechanism operated by cross shaft 104 either becomes jammed or the rotation of the shaft is restricted by mechanical stops or other means from rotating the full amount corresponding to the stroke of the hydraulic actuator, 16.

Figure 3:
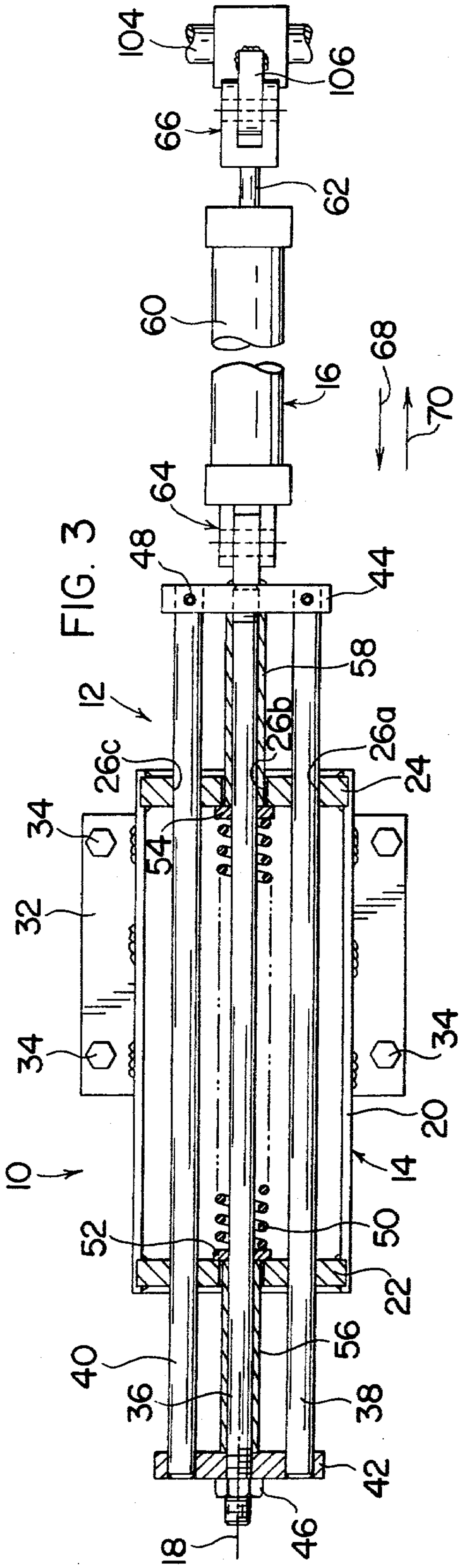
FIG. 3 is a plan view of the force limiter shown in FIG. 1 showing a slide assembly portion of the limiter in an intermediate or equilibrium position.
Figure 4:
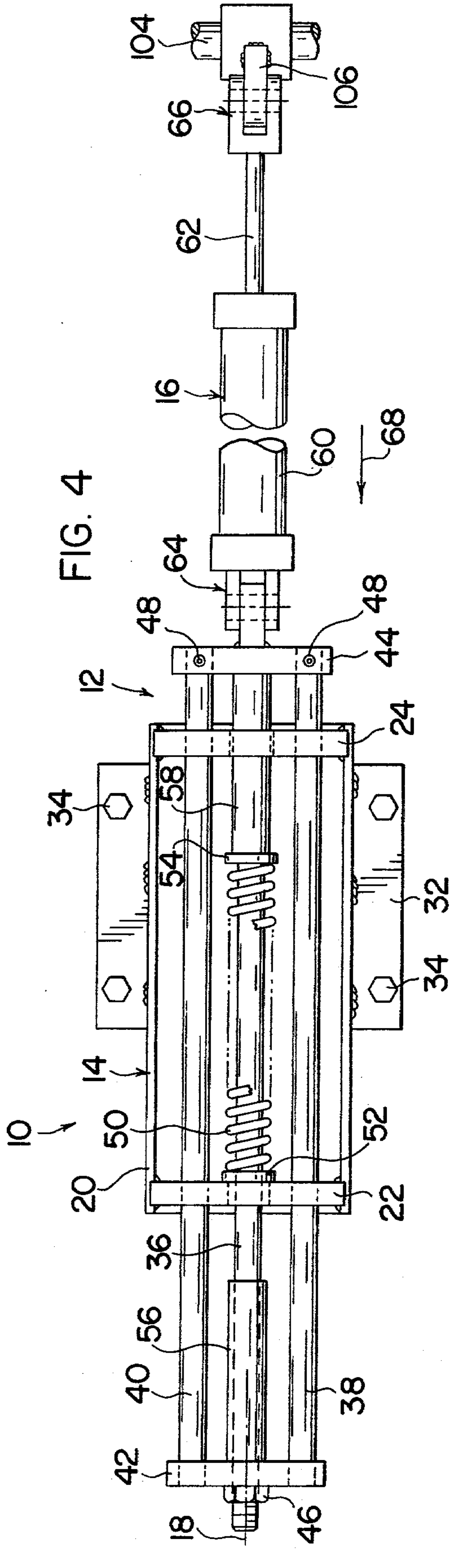
FIG. 4 is a plan view of the force limiter shown in FIGS. 1 and 3 showing the slide assembly portion of the limiter in a leftward extended position.

When the hydraulic actuator 16, in response to pressurized hydraulic fluid supplied through various valves, hoses, and fittings (not shown), applies a force to the slide assembly 12 in the direction of the arrow 68, the force is transferred through the clevis connection 64, the end plate 44, the spacer sleeve 58, and the thrust washer 54 (which elements are subject to a compressive load) and applied to the end of the spring 50 as an axially directed load. This load causes the spring 50, the other end of which is constrained by the guide plate 22, to compress and shorten its overall length in response to the magnitude of the applied force. The amount of deflection or shortening varies with the magnitude of the applied load and as a function of the selected spring constant. As shown in FIGS. 3 and 4, the slide assembly 12 displaces along its longitudinal axis 18 in the direction of the arrow 68 from the intermediate or equilibrium position of FIG. 3 to a leftward extended position as shown in FIG. 4. As can be appreciated, the force applied to the twist lock cross shaft by the hydraulic actuator 16 can not exceed and is limited by the reaction force of the spring 50.

When the hydraulic actuator is caused to apply a force through the slide assembly 12 in the direction of the arrow 70, opposite from that of the arrow 68, the force is transferred through the clevis connection 64, the end plate 44, the shaft end rods 36, 38, and 40, (which elements are subject to a tensile load); and the end plate 42; the spacer sleeve 56, and the thrust washer 52 (which elements are subject to a compressive load); and applied to the other end of the spring 50 as an axially directed load. The spring 50, as described above, compresses to shorten its overall length in response to the magnitude of applied force allowing the slide assembly to move to the right in the direction of the arrow 70 as the applied force is accommodated by the spring 50.

As can be seen from the above, the maximum force that can be applied by the hydraulic cylinder in either direction is limited to the spring reaction force, which can be selected to meet the design requirements of a particular application.

It is always desirable for the force limiter to remain in its equilibrium position when the mechanism operated by the hydraulic actuator is functioning normally. This requires that the spring preload, in the equilibrium position, be greater than the forces normally encountered by the hydraulic actuator in locking or unlocking the twistlocks. For a normal function, therefore, the effect on the hydraulic actuator is as though the force limiter was a rigid connection. This is done by selecting a spring with a free or unrestrained length greater than the distance between the guide plates 22 and 24. The spring is then compressed, inserted between, and constrained by the guide plates 22 and 24. The amount the spring 50 is compressed and its spring constant determine the magnitude of the preload. For example, if a spring is selected with a spring constant of 100 lbs./in and is compressed two inches before it is inserted between the guide plates, the spring will have a 200 lb. preload. Consequently, the force applied to the slide assembly 12 must increase to a magnitude above 200 lbs. before the spring 50 will yield allowing the slide assembly 12 to shift its position.

In order to prevent either end plate 42 and 44 from contacting its respective guide plates 22 and 24, the stroke of the hydraulic actuator 16 and the slide assembly 12 are selected such that the stroke of the hydraulic actuator is less than that of the slide assembly.

In addition to selecting a spring constant suitable for a particular application, it is also possible to provide a force limiter in accordance with the present invention having a plurality of springs, either concentrically or serially located with respect to the shaft 36 and the guide rods 38 and 50, which provide either a linear or non-linear spring constant. Also, while the disclosed force limiter has been shown, as in FIG. 3, having an equilibrium position with the end portions of the slide assembly 12 extending equally outward from the support structure 14, the respective lengths of the spacer sleeves 56 and 58 can be varied to provide an equilibrium position in which one end of the slide assembly 12 extends outwardly more than the other end. All lost motion in the force limiter is removed at assembly, by means of adjustment nut 46. The nut is then secured in that position by drilling a hole through both the nut and the shaft 36 and installing a spring pin.

While the force limiter of the present invention has many applications where it is desired to limit the magnitude of an applied force, it is particularly suitable for use in combination with twist lock assemblies of spreader type cargo-container handling devices. While spreader designs vary, they generally include a gantry-like frame which is adapted to fit over standard-size cargo-containers, such as the type commonly carried on container ships.

Figure 5:
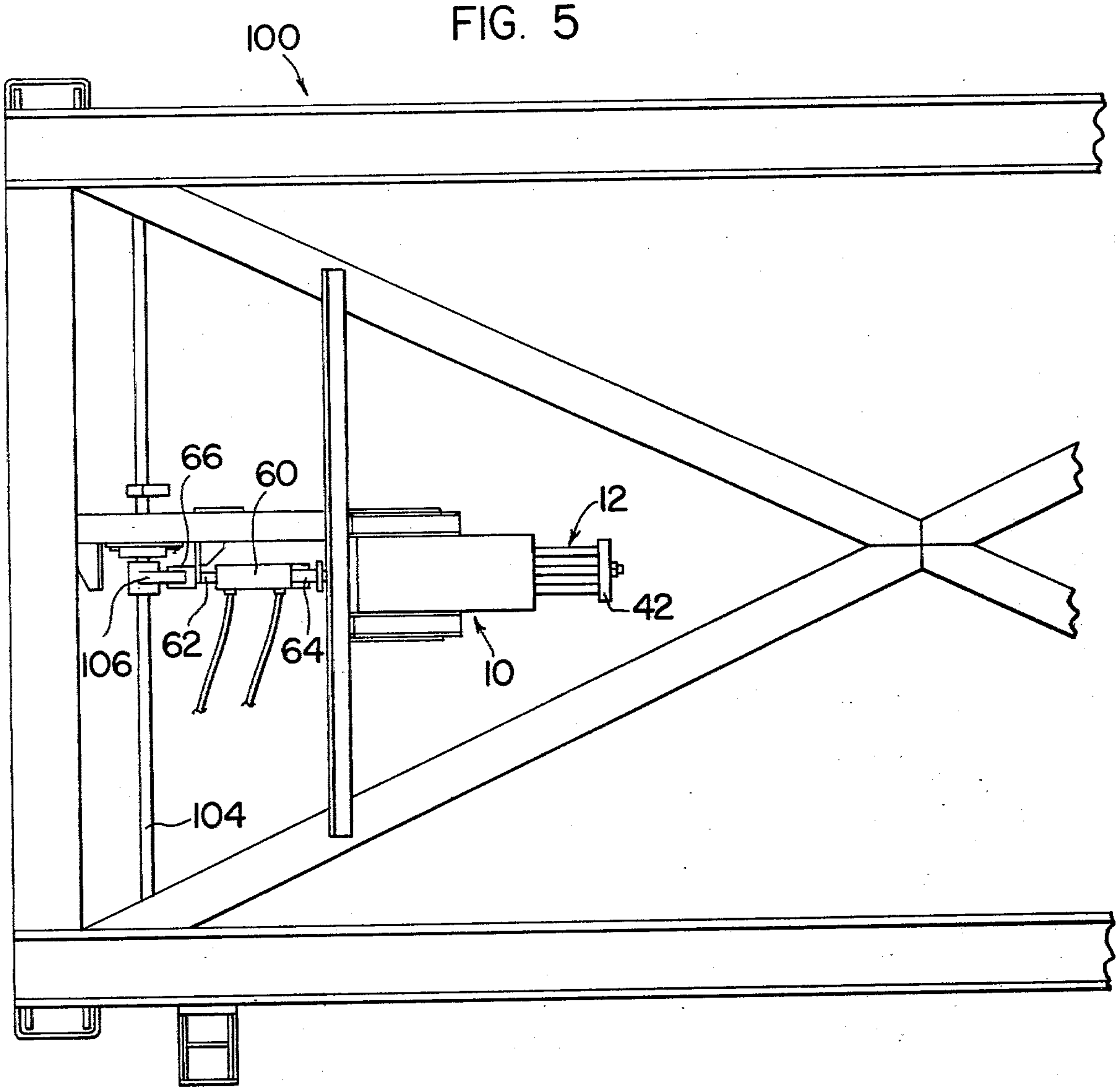
FIG. 5 is a partial plan view of a spreader assembly for attaching to and detaching from cargo containers showing the force limiter of FIGS. 1–4 connected between the spreader frame and a hydraulic actuating cylinder.
Figure 6:
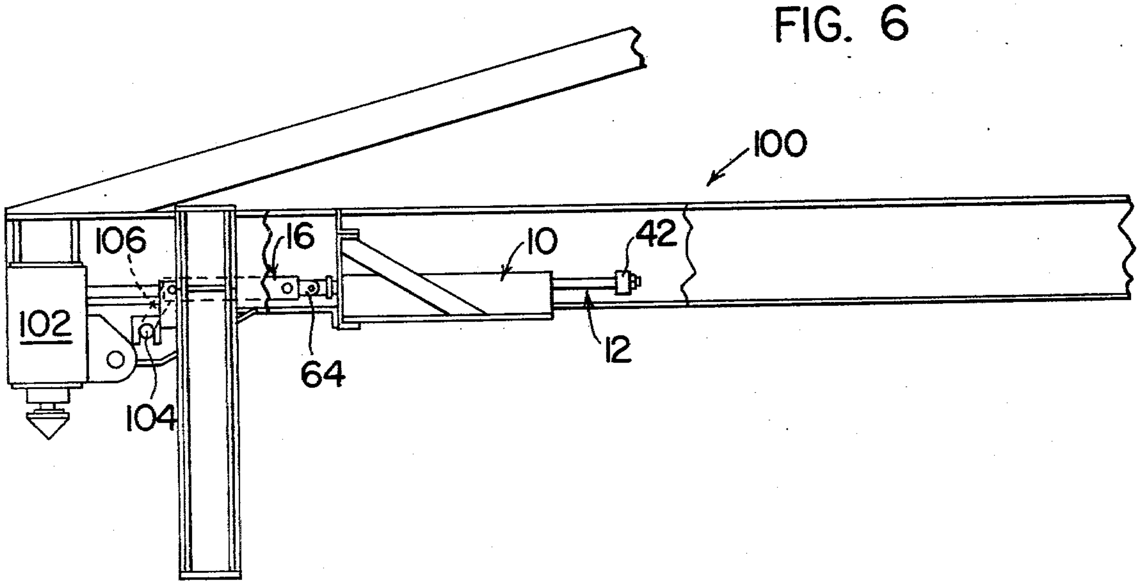
FIG. 6 is a side elevational view of the force limiter and hydraulic cylinder portion of the spreader of FIG. 5 with selected portions of the spreader structure broken away for reasons of clarity.

An end portion of an exemplary spreader is shown in FIGS. 5 and 6 and includes a main frame 100 fabricated from a plurality of welded or riveted structural steel members. The frame 100 is adapted to straddle and fit over a cargo-container (not shown) and includes a plurality of twist locks 102, each of which is adapted to engage a complementary lock receiving structure on the container. When the lock 102 is in place and actuated from an unlocked to a locked position, the frame 100 and container are effectively attached to one another such that a lifting device, for example a crane, can lift and transport the frame and container.

The twist locks 102 shown in FIGS. 5 and 6, the details of which are not necessary to an understanding of the present invention, are connected to each other by a cross shaft 104 which extends along the lateral dimension of the frame 100. An actuating arm 106 is clamped or otherwise secured at the midpoint of the cross shaft 104 and pivotally connected to the actuator ram 62 by the clevis and pin connection 66. The actuator cylinder 60 is connected, as described above in connection with FIGS. 1–4, by the clevis and pin connection 64 to the force limiter 10 which is mounted on a portion of the frame 100. The actuator arm 106 and the cross shaft 104, which are shown in the elevational view of FIG. 1, are adapted to rotate about the longitudinal axis of the cross shaft between the solid line and broken line positions of FIG. 1 to cause the twist locks 102 to attach to and detach from the container.

In effecting the locking and unlocking operation, it is important that excessive force not be applied to the locks. For example, many types of locks include a device which prevents or blocks unlocking when the spreader and container are in a suspended position, and, as occasionally happens, twist locks can fail to perform because of a mechanical jam. An excessive force applied to the lock in either of these two situations can, respectively, defeat the safety device or permanently damage the lock. The force limiter of the present invention provides a means by which the force applied to the lock, in either direction, can be effectively limited to a safe, predetermined magnitude.

As is apparent to those skilled in the art, various changes and modifications may be made to the force limiter and spreader assembly of the present invention without departing from the spirit and scope of the present invention as recited in the appended claims and their legal equivalent.

What is claimed is:

1. A force limiter and spreader apparatus for attaching to and detaching from cargo-containers comprising:

a spreader means including a frame and twist lock means for engaging a cargo-container, said twist lock means having a locked and unlocked position and being selectively actuatable to either of said positions by the application of a force to a rotatable shaft included in said lock means;

a force supplying hydraulic actuator means in the form of a hydraulic cylinder connected to said rotatable shaft of said lock means for selectively actuating said twist lock means to either of said positions;

force limiting means including a support means, a yieldable force bias means and an actuatable shaft;

said force limiting means being operably connected between said force supplying hydraulic actuator means and said spreader frame for limiting the magnitude of the force applied by said force supplying hydraulic actuator means to said twist lock means.

2. A force limiter and spreader apparatus for attaching to and detaching from cargo-containers comprising:

a spreader means including a frame and twist lock means for engaging a cargo-container, said twist lock means having a locked and unlocked position and being selectively actuatable to either of said positions by the application of a force to said lock means;

a force supplying hydraulic actuator means connected to said lock means for selectively actuating said twist lock means to either of said positions;

force limiting means including a support means, a yieldable force bias means and an actuatable shaft connected to said force supplying hydraulic actuator means and said spreader frame for limiting the magnitude of the force applied by said force supplying hydraulic actuator means to said twist lock means.

3. The apparatus claimed in claim 2, wherein said lock means are of the twist lock type and include a shaft rotatable between said lock and unlock positions.

4. The apparatus claimed in claim 2, wherein said force supplying hydraulic actuator means comprises an hydraulic cylinder.

5. The apparatus claimed in claim 2, wherein said support means includes a channel member having spaced apart guide plate means mounted transversely on said channel member, said guide plate means having coaxial bores formed therethrough for mounting said actuatable shaft.

6. The apparatus claimed in claim 2, wherein said yieldable force bias means comprises a helical coil spring mounted on said actuatable shaft between spaced apart guide plates.

7. The apparatus claimed in claim 6, wherein said helical coil spring is in a preloaded condition.

8. The apparatus claimed in claim 6, further comprising thrust washer means mounted on said actuatable shaft between each end of said helical coil spring and the respective adjacent guide plate means at that end.

9. The apparatus claimed in claim 8, further comprising spacer sleeve means mounted on each end of said actuatable shaft, one end of each spacer sleeve means adapted to contact its respective thrust washer means.

10. The apparatus claimed in claim 9, wherein said spacer sleeve means are of equal length to thereby establish an intermediate position for said actuatable shaft.

11. The apparatus claimed in claim 2, wherein said actuatable shaft is part of a slide assembly including at least one guide rod substantially parallel to said actuatable shaft and connected to said actuatable shaft by end plates at the ends of the actuatable shaft and guide rod.

* * * * *